Feb. 26, 1957 F. HINTERMAYR 2,782,797
FLOATS FOR THE CARBURETTORS OF INTERNAL COMBUSTION ENGINES
Filed July 13, 1953 2 Sheets-Sheet 2

INVENTOR
F. Hintermayr

United States Patent Office 2,782,797
Patented Feb. 26, 1957

2,782,797
FLOATS FOR THE CARBURETTORS OF INTERNAL COMBUSTION ENGINES

Fritz Hintermayr, Nurnberg-Reichelsdorf, Germany

Application July 13, 1953, Serial No. 367,701

9 Claims. (Cl. 137—409)

Floats for the carburettors of internal combustion engines have hitherto been rockably secured to the float casing on one side by means of a hinge in such a way that they rocked up or down about the axis of the hinge with any alteration in the level of the liquid fuel. Such a method of supporting the floats had the disadvantage that it also reacted to any surging of the fuel, thereby closing or opening the fuel supply, so that too much fuel often entered the float casing, and the motor became flooded with fuel.

This disadvantage is obviated by the present invention by connecting the float, particularly the so-called ring float, with an annular disc, which forms a hinge-like support for the float. This annular disc may be immersed in the fuel, may rest directly upon the surface thereof, or may be located immediately above the surface, the arrangement thereof being subject only to the condition that it can in every case produce a damping effect. The one-sided engagement of this annular disc between two abutments on the float casing here takes the place of the hinge hitherto usual.

According to a further feature of the invention the external diameter of the annular disc is only slightly less than the internal diameter of the float casing, so that it is guided on the inner peripheral surface of the float casing with small clearance. The one-sided hinge-like supporting means of the annular disc is preferably arranged on that side of the float casing upon which the nozzle controlled by it is provided.

The pivotal supporting of the annular disc is effected, according to a further feature of the invention, preferably by two transverse ribs, which are provided on the internal wall surface of the float casing, and between which the annular disc is supported with clearance. In order to secure the float against rotation, the annular disc may be provided with one or more recesses, by which it is guided on longitudinal ribs on the inner peripheral surface of the float casing. The annular disc itself may consist of a corrosion-proof metal or of a synthetic material, and may advantageously be secured to the float by shrinking it on for example.

Instead of anchoring the annular disc in the float casing, however, it is also possible to allow it to engage in a counter-bearing which is provided on an element extending downwards from the carburettor housing into the float casing. As a counter-bearing there may for instance be employed two projections protruding from the extension of the carburettor casing, or else transverse slots machined in this extension. The provision of the counter-bearing for the annular disc directly on extension from the carburettor casing has the advantage that the float is no longer connected with the float casing but with a part of the carburettor housing itself. It is consequently possible to remove the float casing by itself from the carburettor, while the float still remains on the carburettor housing. The assembling and dismounting of the carburettor are thereby facilitated.

In order that the float, notwithstanding this one-sided plug-like connection, may not drop away from the carburettor housing when the float casing is removed, there is secured to the float an angle piece, the upwardly projecting free limb of which bears, with the float hanging down, against an abutment fitted, preferably releasably, to the carburettor housing. The float is then held by gravity. The abutment may be of a particularly simple design, if it is constructed as a stirrup which at the same time serves as a holding member for the valve needle. If, after removal of the float casing, the float is likewise to be taken out, it is first raised again, the limb of the angle piece being thus rocked away from the abutment. From this raised position the float can then be drawn obliquely downwards, the abutment resiliently yielding to some slight extent.

Various embodiments of the invention are illustrated by way of example in the accompanying drawings, in which:

Figure 3 shows a detail of the carburettor illustrated in Figures 1 and 2:

Figure 1:
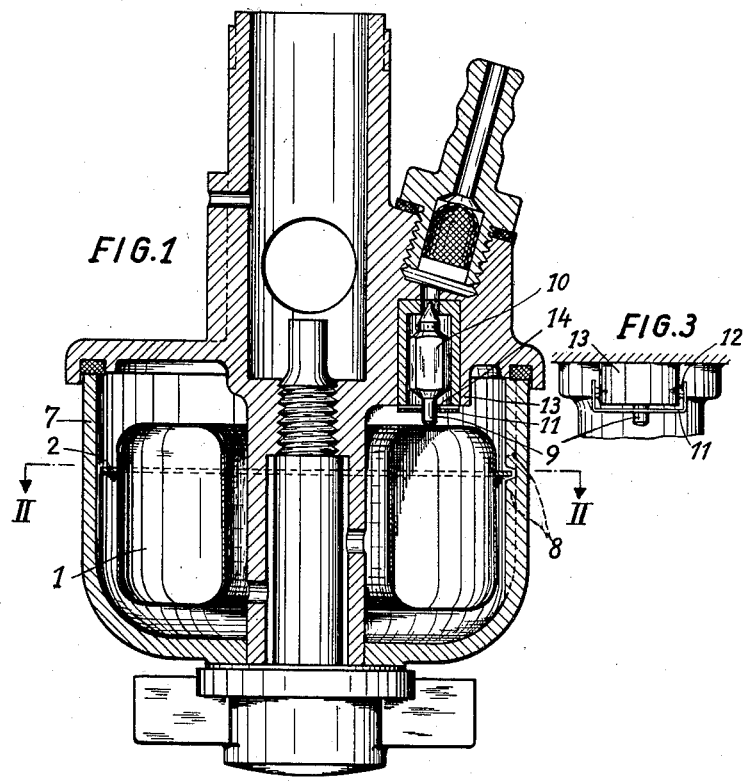
Figure 1 shows one form of construction in a longitudinal section through the carburettor.
Figure 2:
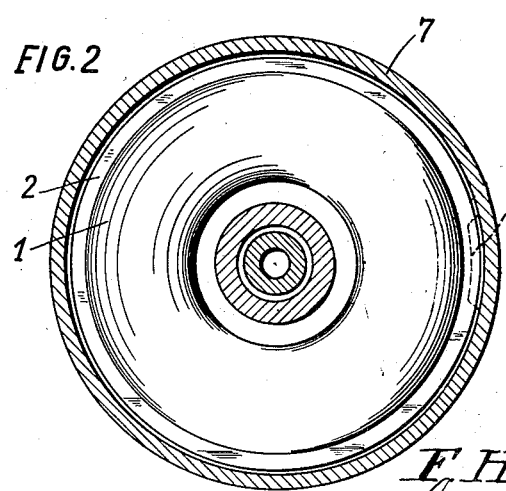
Figure 2 shows a section on the line II—II in Figure 1.
Figure 4:
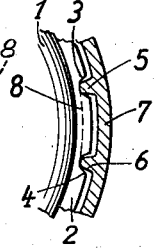
Figure 4 shows a modified construction of the holding of the annular disc.

The float 1 of the carburettor shown in Figures 1 and 2, and of the modification shown in Figure 4, carries an annular disc 2, which may consist either of metal or of a synthetic material, and is fixedly connected with it. If it consists of metal it may be secured to the float either by shrinking it on, or by soldering or welding for example. Its external diameter is slightly less than the internal diameter of the float casing 7, so that it is guided with slight clearance inside the float casing and cannot swing to and fro. It bears preferably directly upon the surface of the liquid fuel. It may however alternatively be immersed in it, or be arranged above it in such a way that it is still in a position to damp the oscillations of the fuel. It is furthermore provided with two recesses 3 and 4, as shown in Figure 4, by which it is guided on longitudinal ribs 5 and 6 on the internal wall surface of the float casing 7, so that the float is prevented from rotating. Below and above the annular disc 2 are provided transverse ribs 8, preferably between the two longitudinal ribs 5 and 6, and between these two transverse ribs 8 the annular disc is guided with clearance. The guidance may alternatively be effected merely by appropriate recesses in the longitudinal ribs 5 and 6, as shown in Figure 1. In this case however it is not practicable to provide at this place means of the kind described above for preventing rotation.

Upon the float rests an extension 9 of the float needle 10, so that the latter, upon a change in the level of the fuel, is displaced up or down, and thereby regulates the fuel supply. The extension 9 of the float needle 10 is guided in a bore 14 in a sheet-metal strip 11 constructed as a spring, which is secured by means of lugs or pointed tips 12 to a part 13 by clamping, so that the nozzle needle, even when it is not resting upon the float, is held in its guide.

All other parts of the carburettor operate in the known manner, so that no further description need be given here.

If an annular float constructed according to this invention is provided in a motor cycle, for example, and the fuel in the float casing starts tossing about when the cycle is running the float does not react to these rapidly varying movements of the surface of the fuel, because the annular disc 2 exerts a damping effect. Only when the surface level as a whole rises or falls is the annular float rocked upwards or downwards about the hinge point at 8, so that the nozzle needle 10 is moved up or down and the fuel supply correspondingly regulated.

Figure 5:
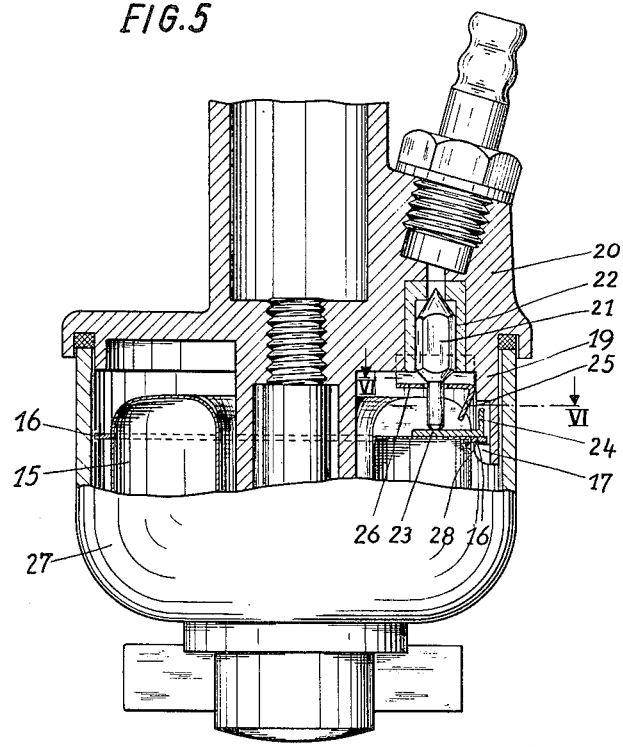
Figure 5 shows a longitudinal section through a further form of construction of the invention.
Figure 6:
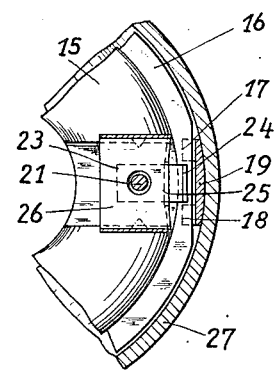
Figure 6 shows a section on the line VI—VI in Figure 5.

In the form of construction illustrated in Figures 5 and 6, the construction of the carburettor is similar to that of the embodiment previously described. The float 15 is likewise provided with an annular disc 16, which at the same time serves as a bearing for the float. When the carburettor is ready for operation the annular disc 16 rests upon two projections 17 and 18, which, however, as distinguished from the arrangement previously described, are arranged on an extension 19, of the carburettor housing 20. Instead of the projections 17 and 18, however, two transverse slots may be provided in the extension 19, and the annular disc 16 is then hingedly supported in these. 21 denotes the valve needle, which is accommodated in a bore 22 in the carburettor housing 20. To the float 15 is secured, in addition to the annular disc 16, an angle piece 23, the free limb 24 of which extends upwards. In the condition of readiness for operation this free limb faces an abutment 25, which is constructed as a bent element of a stirrup 26. The stirrup 26, which is releasably connected to the carburettor housing 20, at the same time takes over the duty of preventing the valve needle 21 dropping out when the float 15 is dismantled.

The construction of the supporting bearing illustrated in Figures 5 and 6 for the float 15 has the advantage that the carburettor is particularly easy to assemble and can also be readily dismantled. If the float casing 27, after releasing bolts and nuts not indicated in the drawings, is drawn downwards, the float 15 descends rocking downwards about the point 28, until the limb 24 of the angle piece 23 bears against the abutment 25. By its own weight the float is held in this position, so that the float casing 27 can be drawn out by itself. If the float also is to be removed, the latter is first raised again, by rocking it about the point 28, the limb 24 of the angle piece 23 being thus moved away from the abutment 25. The float can then be drawn obliquely downwards, and the abutment 25 can spring back. The assembling is effected in the reverse sequence.

What I claim is:

1. In a carburetor for an internal combustion engine of the type in which the carburetor includes a cylindrical float casing removably secured to a carburetor housing, a bore in said carburetor housing, a valve in said bore, and in which said float casing retains a supply of fuel at a substantially constant level by means of said valve, an annular float positioned to bear against said valve to operate it, said float being enclosed in said float casing, the improvement comprising an outwardly extending annular flange encircling said float substantially at the level of said fuel on said float as it floats freely in said fuel.

2. A float as claimed in claim 1, characterized by the feature that the external diameter of the annular disc is only slightly less than the internal diameter of the float casing.

3. A float as claimed in claim 2 characterized by the feature that the inside wall surface of the float casing is provided with two ribs, between which the annular disc of the float is held with clearance.

4. A float as claimed in claim 1, characterized by the feature that the valve resting upon the float body is prevented from falling out of the bore allocated to it by a spring extending across said bore.

5. In a carburetor for an internal combustion engine of the type in which the carburetor includes a cylindrical float casing removably secured to a carburetor housing, a bore in said carburetor housing, a valve in said bore, and in which said float casing retains a supply of fuel at a substantially constant level by means of said valve, an annular float positioned to bear against said valve to operate it, said float being enclosed in said float casing, the improvement comprising an outwardly extending annular flange encircling said float substantially at the level of said fuel on said float as it floats freely in said fuel, said annular disc serving as a bearing and positioning member for the float, and a counter-bearing extending downwardly from the carburetor housing into the float casing and being constructed and arranged to engage the edge of said disc.

6. A carburettor equipped with a float as claimed in claim 5, characterised by the feature that the counter-bearing comprises two projections which protrude from the downward extension of the carburettor casing.

7. A carburettor as claimed in claim 5, characterised by the feature that the counter-bearing comprises two transverse slots, which are machined in the downward extension of the carburettor casing.

8. The device of claim 5 including an angle piece secured to the float, and an abutment on the carburetor housing within the float casing adjacent said counter-bearing, said angle piece being so constructed and arranged that upon removal of the float casing from the carburetor casing the float is supported by said angle piece from said counter-bearing.

9. The device of claim 8, in which said angle piece is formed as part of a plate secured to the top of said float, said plate also acting as a wearing strip contacting said valve.

References Cited in the file of this patent

UNITED STATES PATENTS

| 1,120,070 | Lytton | Dec. 8, 1914 |
| 2,064,596 | Edelen et al. | Dec. 15, 1936 |